June 3, 1969 K. B. CARLSON 3,447,777

VALVE CONSTRUCTION

Filed Feb. 2, 1966

INVENTOR.
KENNETH B. CARLSON
By Herzig, Walsh & Blackham
ATTORNEYS.

United States Patent Office 3,447,777
Patented June 3, 1969

3,447,777
VALVE CONSTRUCTION
Kenneth B. Carlson, Granada Hills, Calif., assignor to Monogram Industries, Inc., Culver City, Calif.
Filed Feb. 2, 1966, Ser. No. 529,601
Int. Cl. F16k *1/36, 31/46;* F16g *11/10*
U.S. Cl. 251—144                          4 Claims

ABSTRACT OF THE DISCLOSURE

A valve construction having a movable cylinder telescopically mounted on a stationary cylinder with the valve plate mounted around the free end of the movable cylinder, a seal between the cylinders, a biasing means within the cylinders to urge the movable cylinder downwardly and a control means partially within the cylinders adapted initially to move upwardly without moving the movable cylinder and subsequently to move the movable cylinder upwardly.

---

The present invention relates generally to a valve construction, and more particularly to a valve construction for the tank of a self-contained, re-circulating sanitation or toilet system.

The present invention has particular application for a self-contained re-circulating toilet system of the type used in aircraft, boats, trailers and the like. The tank or waste receptacle of such a system is normally partially filled with a liquid chemical solution and incident to the operation of the system receives waste material, tissue paper and other foreign objects and material. While modern systems of this type operate for a considerable time period through the filtering and reuse of the liquid in the system, the liquid in the tank is periodically removed and the tank cleaned. This is usually accomplished through a drain outlet at the bottom of the tank. The drain outlet is normally closed by a valve construction that is submerged in the liquid and is movable to open the outlet drain and permit liquid, solid material, and sludge in the tank to flow out of the tank. A spray system may be incorporated in the tank to assist in the cleaning or a hose or other suitable means may be used to clean or flush out the tank.

With surprising frequency, strange objects or material find their way into the tank. Sometimes such material is too large or bulky to pass freely through the outlet. Maintenance people, often pressed for time, will probe or poke with a tool such as a screwdriver to dislodge or break up such solid material to permit it to pass through the outlet. Previously valve constructions for such systems have been constructed with their mechanism enclosed in a flexible, waterproof sheath, cover or boot of material such as rubber which serves to protect the mechanism from the solution and the waste material in the tank while affording the flexibility to permit the valve construction to be raised to open the outlet drain.

While such a flexible sheath or boot generally operates satisfactorily, it is readily subject to damage as by being punctured by a tool used to clear the outlet. Any puncture in the rubber sheath of course permits the liquid from the tank to enter the sheath and rust and corrode the mechanism and serve to shorten its useful life.

The present invention contemplates housing means for the submerged valve construction which provides a solid relatively impregnable shield for the valve mechanism while also permitting the necessary movement of the valve construction to open and close the drain outlet.

Accordingly, the object of the present invention is to provide a novel and improved valve construction.

A more specific object of the present invention is the provision of a submerged valve construction which provides a durable and relatively impregnable shield for the mechanism of the valve that maintains the mechanism separated from the surrounding liquid while permitting the necessary movement of the valve construction.

A further object of the present invention is to provide a compact, strong, durable resistant valve construction of the type shown.

Still another object is to provide a novel and improved releasable coupling arrangement that is particularly adapted for use with such a valve construction.

Various other objects and advantages of the present invention will become more apparent from the following description and the accompanying drawings.

Figure 1:
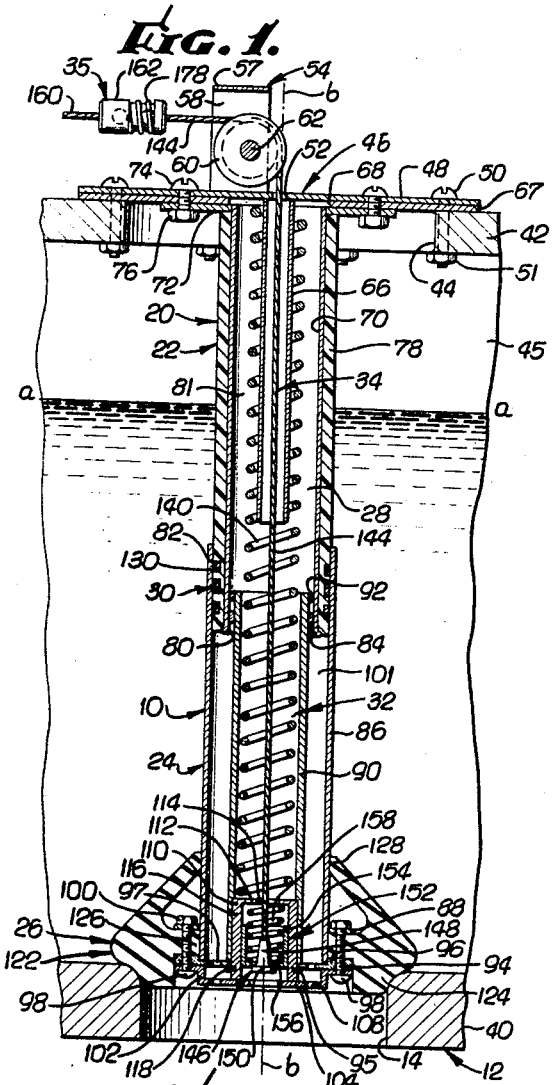
FIGURE 1 is a side view of a submerged retractable valve construction for a liquid waste tank, portions of the the tank and portions of actuating means for the valve construction, said valve construction comprising a presently preferred form of the invention and being shown in its lowered and closed position to close the drain outlet.
Figure 2:
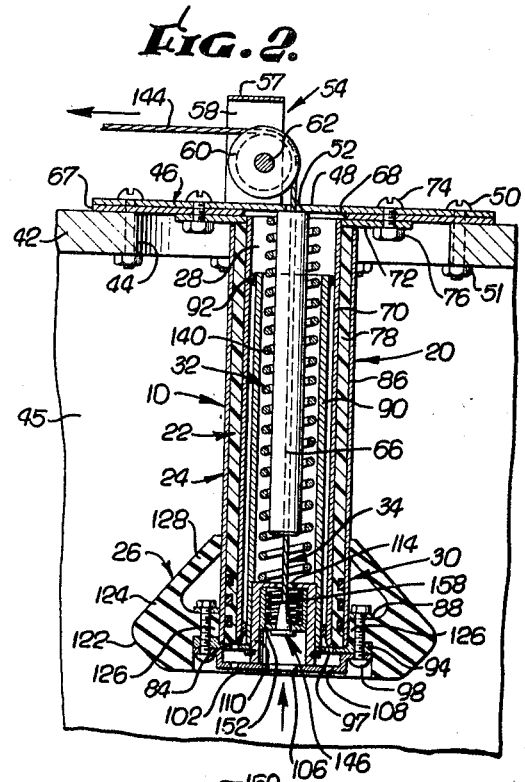
FIGURE 2 is a side sectional view generally similar to FIGURE 1 with the valve construction being shown in a raised position to open the drain outlet.

Briefly, the illustrated valve construction 10 which is a presently preferred form of the invention, is adapted to be installed in a tank 12 of a self-contained re-circulating toilet system so as to extend into the tank and selectively close or open the drain outlet 14 at the bottom of the tank. The valve construction 10, which is submerged in the liquid in the tank, includes a solid-wall rigid valve housing 20 comprised of a pair of cylindrical telescoped sections: a first stationary section 22 and a second movable section 24. The first section 22 is secured to the tank wall above the drain outlet 14 and extends downwardly into the tank. The second section 24 is movably supported in telescoping relation to the first section so as to extend further downwardly into the tank. A valve means 26 is mounted adjoining and surrounding the lower end of the movable section. The movable section 24 is movable between a first lowered position, as shown in FIGURE 1, where the valve means 26 seats with and closes the drain outlet 14 and a second raised or retracted position, as shown in FIGURE 2, where the valve means 26 is spaced from the drain outlet to permit liquid and material to flow from the tank. The sections provide a shield which defines an interior housing area 28, and sealing means 30 are provided between the sections to keep the liquid and waste material from the tank out of the housing area. Biasing spring means 32 are provided in the housing area to urge the movable section downwardly to its normal lowered position to close the drain outlet. Control means 34 are also provided within the housing area to permit the movable section 24 to be raised to open the drain outlet. The illustrated control mens 34 includes a releasable coupling arrangement 35.

The illustrated tank 12, which is constructed of a suitable corrosion-and-rust-resistant durable material, includes a lower horizontally extending wall 40 which defines the drain outlet 14 communicating to the exterior of the aircraft. The drain outlet 14 is a generally circular hole or aperture with its upper annular edge, which is within the tank, being curved or rounded. The tank 12 also includes an upper horizontal wall 42 that is provided with a circular aperture 44 positioned above and vertically aligned with the drain outlet 14. The tank 12 also includes vertical sidewalls 45. Periodically, the tank is emptied and cleaned and a batch of fresh liquid chemical solution is put into the tank. The batch of solution only occupies the lowermost portion of the tank, but as waste and foreign material, particularly liquid waste, is added to the tank, the level of liquid in the tank rises. The level shown in FIGURE 1 and designated a—a, is representative of the level in the tank after substantial use of the system, although space remains in the upper portion of the tank for additional use. The terms "liquid" and "solution" are used herein to refer generally to mixture of liquid chemical solution and liquid waste together with particles of foreign and waste material.

The valve construction 10 is mounted to the upper wall 42 and extends downwardly into the tank through the aperture 44. The valve construction is at least partially immersed or submerged in the liquid in the tank, and incident to the normal operation of the system, the level of liquid in the tank may be above the meeting line between the housing sections for extended periods of time.

Figure 3:
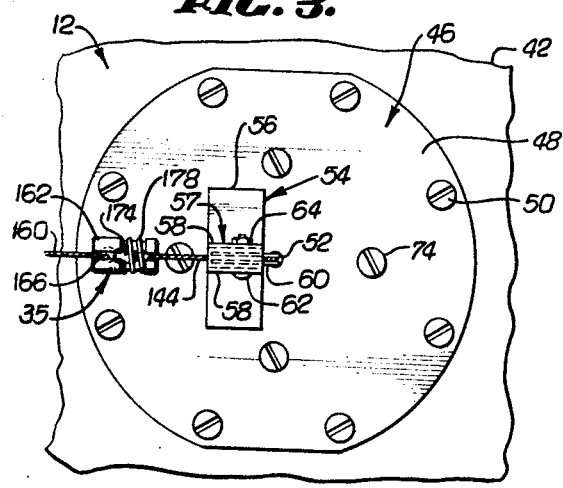
FIGURE 3 is a plan view of the valve construction and of a portion of the tank as shown in Figure 1.

More particularly, a mounting plate assembly 46 is provided which includes a generally circular top or cover plate 48 (FIGURE 3) which is somewhat larger than the size of the aperture 44. The cover plate 48 is secured generally centrally over the aperture 44 by bolts 50 and nuts 51. The cover plate 48 is provided with a center hole or aperture 52 to accommodate the control means. The hole 52 defines the center vertical axis b—b of the device. The assembly 46 further includes a pulley support 54 which is secured to the upper surface of the plate 48 adjacent the center hole 52. The pulley support 54 includes a base portion 56 fixed to the plate 48 and an inverted U-shaped bracket portion 57 secured to and extending upwardly from the base portion. The bracket portion 57 includes a pair of spaced vertically-extending legs 58. A pulley 60 is mounted between the legs 58 for rotation about the axis of a support shaft provided by a clevis bolt 62 and a nut 64 mounted through the legs 58. The pulley 60 is positioned with one edge generally vertically aligned with the center hole 52. The assembly 46 further includes a circular cylindrical upper guide tube 66 which is secured at its upper end to the lower surface of the cover plate 48. The tube 66 is centered below the hole 52 and extends downwardly into the tank. The assembly 46 and associated means will be discussed more fully below in connection with the control means for the valve construction.

A sealing gasket 67 having the general shape of the plate 48 is disposed between that plate and the upper tank wall 42. The gasket 67 has a large center aperture 68 which is centered below the center hole 52.

The upper stationary housing section 24 is secured to the cover plate 48 and extends downwardly into the tank as noted above. More particularly, the housing section 24 includes a tubular metal circular cylindrical inner guide tube liner 70 which has secured to its upper edge an annular mounting flange 72. The flange 72 is secured to the underside of the cover plate 48 by bolts 74 and nuts 76. A tubular, circular cylindrical outer guide tube sleeve 78 made of a suitable solid material such as Teflon is disposed around the liner 70 and is supported in position by the lower edge 80 of the liner which is bent or crimped outwardly. The liner 70 and the sleeve 78 extend downwardly into the tank a substantial distance further than does the tube 66 and the inner dimension of the liner 70 is substantially larger than the outer dimension of the tube 66 to define an annular cavity 81 therebetween. Adjacent the lower end of the sleeve 78, three vertically spaced annular grooves 82 are formed in the outer wall of the sleeve 78. An inwardly extending annular flange 84 is secured adjacent the lower end of the liner 70.

The lower movable section 24 includes a metal outer circular cylindrical sleeve 86 which is proportioned and adapted to have its upper end telescope over and around the lower end of the guide tube sleeve 78. Thus, the external wall of the stationary housing section, which is provided by the sleeve 78, and the external wall of the movable housing section, which is provided by the sleeve 86, are both solid and of a generally permanent configuration, which will withstand and is impenetrable by ordinary contact or probing even with a sharp hard instrument such as a screwdriver. An annular flange 88 is secured adjacent the lower end of the sleeve 86. The housing section 24 also includes a metal inner circular cylindrical lower guide tube 90, the upper end of which is proportioned and adapted to be received in the lower end of the liner 70. An annular spacing flange 92 is secured adjacent the upper end of the guide tube 90 to slidingly engage the inner surface of the liner 70. The lower end of the tube 90 is counterbored to receive a downwardly open cup-shaped cylinder 110. The cylinder 110 includes a horizontal upper wall 112 having a center hole or aperture 114 and a cylindrical sidewall 116 which extends downwardly below the lower end of the tube 90. An annular groove 118 is formed in the sidewall 116 spaced below the lower end of the guide tube 90. A circular annular ring plate 94 is disposed around the cylinder 110 and secured against the lower edge of the guide tube 90 by a retaining ring 95 received in the annular groove 118. The ring plate 94 has a raised peripheral ring portion 96 which defines an upwardly open circular recess that receives the lower end of the sleeve 86. The guide tube 90 and the sleeve 86 are secured together by bolts 98 which pass through the annular flange 88 and the ring portion 96 and are held in place by suitable nuts 100. An annular space or cavity 101 is defined between the guide tube 90 and the sleeve 86. Small apertures or ports 97 are provided in the ring plate 94 inwardly of the ring portion 96 and thus in communication with the annular cavity 101. The flanges 84 and 92 serve as a mechanical stop to retain the lower section 24 connected to the upper section 22 when the valve construction is not mounted in the tank.

The bolts 98 also hold a generally circular bottom plate 102 in place beneath the ring plate 94. The bottom plate 102 includes a circular center portion 104 which is offset downwardly of the periphery of the bottom plate. The center portion 104 is provided with a center hole or aperture 106 and with three circumferentially equally spaced vents or apertures 108 spaced around the center aperture 106.

The valve means 26 comprises an annular valve part 122 of flexible, resilient, resistant material such as various rubber or plastic compositions. The valve part 122 includes a generally ring-shaped body 124 and an integrally formed inwardly directed internal annular flange 126. The valve part 122 is secured to the lower housing section 24. More particularly, the flange 126 is disposed between the flange 88 and the ring plate 94 and held in place by the bolts 98 which pass through the suitable holes in the flange 126. The annular valve part 122 is proportioned to engage the rounded inner or upper rim of the drain outlet 14 to close the outlet when the movable housing section 24 is in its lowered position as shown in FIGURE 1. The valve part 122 normally rests upon the rounded edge of the drain outlet 14 and deforms slightly as shown in that figure to form a tight seal with that edge. Desirably, this seating occurs before the flange 92 engages the flange 84 to mechanically stop the downward movement of the lower section 24. The valve part 122 further includes an integrally formed inwardly directed upper or cover flange of flap 128 which engages the outer wall of the sleeve 86 and serves to protect the bolts 98 and nuts 100 from corrosion and rust.

As noted above, the housing area 28 is defined within the telescoped housing sections 22 and 24. Externally, the meeting or joining line between the sections is at the upper edge of the lower sleeve 86. As noted above, the level of liquid in the tank is normally above this meeting line for extended periods incident to use of the system.

The sealing means 30 provide a sliding seal between the outer wall of the sleeve 78 of the stationary section 22 and the inner wall of the sleeve 86 of the movable section 24.

The illustrated sealing means 30 comprises three generally identical arrangements, one at each of the grooves 82 of the sleeve 78. Accordingly, only one of the sealing arrangements will be described in detail.

Figure 4:
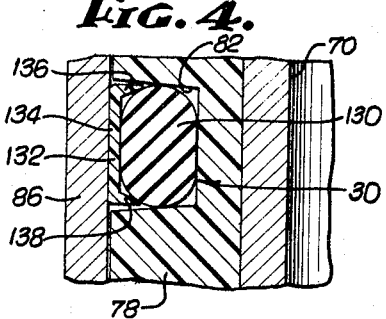
FIGURE 4 is an enlarged view of a portion of the valve construction as viewed in FIGURE 1, showing the sealing means between the valve housing sections.

As shown more clearly in FIGURE 4, each of the grooves 82 is generally rectangular in cross-section but is flared slightly outwardly. A conventional rubber O-ring 130 is received in the annular groove 82 and the O-ring is retained in its groove incident to the raising and lowering of the housing section 24 by a retaining ring 132 of a suitable material such as Teflon. The retaining ring 132 reduces friction and prevents the O-ring 130 from "rolling" in the groove 82 incident to movement of the housing section 24, so that the O-ring is not pinched between parts of the relatively moving sections. The retaining ring 132 is generally a shallow U-shape in cross-section and includes a web 134, an upper flange 136 and a lower flange 138. The retaining ring 132 is received in the groove 82 outwardly of the O-ring, and when the valve construction is assembled as shown in the drawings, the retaining ring 132 will normally compress the O-ring 130 and be urged outwardly by the compressed O-ring so that the outer surface of the web 134 of the retaining ring abuts the inner surface of the sleeve 86. The retaining ring 132 is made of a shape-retaining, but somewhat resilient and flexible, material so that it will maintain itself within the groove 82 incident to relative movement of the sleeve 86 and will also retain the O-ring 130 within the groove. The retaining rings 132 may be sufficiently flexible so that they can be force-fit into position or the sleeve 78 may be constructed in interlocking sections to permit assembly of the rings.

The biasing means 32 of the illustrated valve construction is comprised by a coil or spiral compression valve spring 140 that is disposed within the housing area 28 surrounding the upper tube 66 and received within the lower guide tube 90. The valve spring 140 is seated at its upper end against the underside of the cover plate 48 and at its lower end against the upper surface of the cylinder wall 112. The valve spring 140 tends to urge the movable housing section 24 downwardly so as to seat the valve part 122 with the drain outlet 114 and thereby close the outlet (FIGURE 1).

The control means 34 of the illustrated valve construction includes a stranded metal cable 144 connected at its lower end to the movable valve section 24 and extending upwardly through the housing area 28, over the pulley 60, and connected at its upper end to suitable actuating means (not shown) which are operable to exert a pull on the cable as indicated by the arrow in FIGURE 2, so as to raise the movable section to a position such as shown in FIGURE 2.

More particularly, a plug 146 is secured to the lower end of the cable 144. The plug 146 includes a generally frusto-conical shaped hub section 148 having an annular flange 150 secured around its lower and larger end.

A piston 152 is slidably disposed in the cylinder 110. The piston 152 includes a generally cylindrical side wall 154 which telescopes within the side wall 116 of the cylinder, and a horizontally extending lower wall 156 having a central aperture. A small coil compression spring 158 is disposed within the piston 152 between the upper surface of the piston lower wall 156 and the underside of the cylinder upper wall 112. The spring 158 urges the piston downwardly in the cylinder. The plug 146 is disposed with its flange 150 below the portion of the piston lower wall 156 surrounding the center aperture in that lower wall, and the hub section 148 extends up through the aperture into the piston. The cable 144 extends up through the center of the spring 158 and through the aperture 114 in the cylinder upper wall 112. The cable 144 further extends within the valve spring 140, first within the guide tube 90 and then within the upper tube 66. The cable 144 then extends upwardly through the aperture 52 in the cover plate 48 and around the pulley 60, then extending generally horizontally away from the center axis b—b. The cable 144 is connected to an actuator cable 160 by the releasable coupling or connector 35. The actuator cable 160 may be controlled manually or by power means to pull the cable 144 upwardly.

The aperture 106 in the lower cover plate 102 receives the flange portion 150 of the plug 146 when there is no tension on the cable 144. When the valve construction is installed in a system, however, a certain preload or stress is normally placed on the cable 144, as illustrated in FIGURE 1. Since the valve spring 140 is substantially stronger than the spring 158, such initial normal tension or pull on the cable 144 raises the piston 152 but does not raise the cylinder 110 or the movable section 24. Air within the piston 152 is permitted to pass upwardly through the aperture 114 in the cylinder. Further upward pull on the cable 144 will abut the upper end of the piston 152 with the upper end wall 112 of the cylinder, and still further pull on the cable will raise the section 24 upwardly against the valve spring 140 to a position such as shown in FIGURE 2. Air can pass through the apertures 97 and 108 at the lower end of the movable valve section, through the center aperture 52 in the cover plate, and to some extent between the flanges 84 and 92 and the respective walls that are adjacent those flanges.

Figure 5:
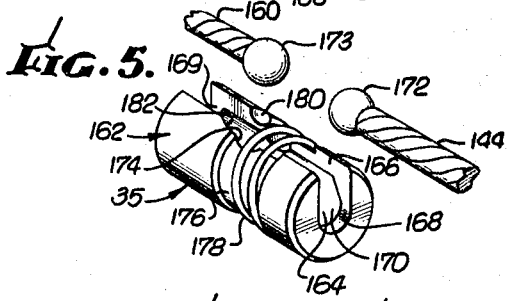
FIGURE 5 is an exploded perspective view of the releasable coupling of the valve construction.

As shown best in FIGURE 5, the coupling 35 includes a coupling element 162 which is generally tubular in shape. The element 162 has a central bore 164 which is open at one side by a longitudinal slot 166. The ends 168 and 169 of the bore 164 are restricted relative to the center portion 170 of the bore so that an enlargement such as the spherical plugs 172 and 173 at the ends of the cables 144 and 160 are free to move longitudinally within the center portion of the bore but are retained within the bore by the ends 168 and 169, respectively. The slot 166 is also proportioned to retain the plugs 172 and 173 except at a point intermediate its length where it defines an enlarged generally circular passage 174 that is large enough to receive a plug 172 or 173. Externally, the element 162 is generally cylindrical and has a reduced diameter section 176 intermediate its length for receiving a coil spring 178. The spring 178 provides a movable closure over the passage 174. One end of the reduced diameter section 176 is generally coincident with the end of the passage 174 closest to the bore end 169. The element 162 is further formed adjacent and outwardly of that end of the passage 174 and along opposite sides of the slot 166 with guide or cam surfaces 180 and 182. To assemble the cable 160 to the coupling 35, the plug 173 is abutted against the cam surfaces 180 and 182 which tend to guide the plug 173 to the passage 174. This causes the plug 173 to push against one end of the spring 178 and to move the spring away from the passage 174 so that the plug can enter the passage and releasably conect to the element 162 as shown in FIGURE 1. This coupling construction permits ready and relatively easy connection of the cable 144 of the valve to control cable 160 under the desired tension.

It will be noted that the lower section 24 of the illustrated valve construction raises or retracts over 4 inches, while the external diameter of the housing (sleeve 86) is under 2 inches. This large amount of retraction travel facilitates ready removal of waste and foreign material from the tank and also permits ready access to the tank interior for other purposes such as maintenance or inspection.

Thus, a simple, compact and economical valve construction is provided. The solid and relatively impregnable housing protects the valve mechanism and parts while permitting necessary relative movement.

What is claimed is:

1. A valve construction for a liquid-holding waste tank of a sanitation system, said valve construction comprising:
   (a) a stationary first rigid housing section secured to an upper portion of said tank above an outlet in a lower portion of said tank and extending downwardly into said tank;

(b) a movable second rigid housing section mounted in telescoping relation to said first housing section and movable to an extended position adjoining said tank outlet, said housing sections enclosing a housing area;

(c) valve means mounted adjoining and surrounding the lower end of said second housing section, said valve means being adapted to engage said tank outlet to close it;

(d) sealing means between said housing sections to keep liquid and material out of said housing area;

(e) biasing means within said housing area for urging said second housing section downwardly to engage said valve means with said outlet; and (f) control means mounted at least partially within said housing area and connected to said second housing section, and control means being adapted to said second housing section upwardly to open said tank outlet.

2. A valve construction as stated in claim 1, wherein said biasing means comprises:

(a) a upper guide tube mounted within said first housing section;

(b) a lower guide tube mounted within said second housing section and adapted to be telescopically received with respect to said upper guide tube; and (c) a valve spring mounted within said housing sections on one of said guide tubes and within the other of said guide tubes.

3. A valve construction as stated in claim 1, wherein said control means is adapted to initially move upwardly without moving said second housing section and subsequently move said second housing section upwardly to open said tank outlet.

4. A valve construction as stated in claim 3, wherein said control means comprises:

(a) a cylinder mounted within said housing area and on said second housing section;

(b) a piston slidably mounted within said cylinder;

(c) biasing means mounted within said cylinder for urging said piston downwardly; and (d) a cable attached to said piston and extending upwardly through said housing area and out of said tank.

References Cited

UNITED STATES PATENTS

| | | | |
|---|---|---|---|
| 635,442 | 10/1899 | Merrill | 251—144 |
| 737,941 | 9/1903 | Leithauser | 251—144 |
| 1,458,816 | 6/1923 | Fyke et al. | 251—144 |
| 2,234,602 | 3/1941 | McIntosh | 287—80 |
| 2,375,548 | 5/1945 | Gilmore | 287—80 |
| 2,449,167 | 9/1948 | Hopewell | 24—223 |
| 3,022,517 | 2/1962 | Harkness | 4—57 |

FOREIGN PATENTS 415,849   9/1934   Great Britain.

M. CARY NELSON, *Primary Examiner.*

W. R. CLINE, *Assistant Examiner.*

U.S. Cl. X.R.

251—294, 80